United States Patent [19]

Hedges et al.

[11] Patent Number: 5,007,966
[45] Date of Patent: Apr. 16, 1991

[54] CYCLODEXTRIN COMPLEXING METHOD

[75] Inventors: Allan Hedges, Crown Point; Frank Tenbarge, Valparaiso, both of Ind.

[73] Assignee: American Maize-Products Company, Stamford, Conn.

[21] Appl. No.: 247,251

[22] Filed: Sep. 21, 1988

[51] Int. Cl.$^5$ ............................................. C08B 30/00
[52] U.S. Cl. ...................................... 127/34; 536/103; 514/58
[58] Field of Search ..................... 127/29, 40, 46.1, 34; 536/103; 514/58; 426/658

[56] References Cited

U.S. PATENT DOCUMENTS

| | | | |
|---|---|---|---|
| 4,352,793 | 10/1982 | Yamahira et al. | 514/659 |
| 4,529,608 | 7/1985 | Szejtli et al. | 127/29 |
| 4,616,008 | 10/1986 | Hitai et al. | 514/777 |
| 4,659,583 | 4/1987 | Hashimoto et al. | 426/629 |
| 4,675,395 | 6/1987 | Fukazawa et al. | 536/103 |

OTHER PUBLICATIONS

Chemical Economy & Engineering Review—Jul./Aug. 1985, vol. 17, No. 7-8, (No. 190), pp. 28-34—Cyclodextrins-Expanding the Development of Their Functions and Applications Shinji Nagatomo.
Acta Chim. Acad. Sci. Hung. 99, 1979—pp. 433-446—Turbidimetric Study of the Crystallization of Cyclodextrin Inclusion Complexes, J. Szejtli et al.
Angew. Chem. Int. Ed. Engl. 19, 344-362, (1980)—Cyclodextrin Inclusion Compounds in Research and Industry, Wolfram Saenger.
Die Starke 27, Jahrg. 1975 Nr. 11—Inclusion Complexes of Unsaturated Fatty Acids with Amylose and Cyclodextrin, J. Szejtli et al.
Perfumer & Flavorist, vol. 11, Feb./Mar. 1986—pp. 49-58, Beta-Cyclodextrin—J. S. Paginton.
Chem. Pharm. Bull. 35(11), 14609-4615(1987)—New Methods for Preparing Cyclodextrin Inclusion Compounds. I. Heating in a Sealed Container, Yoshinobu Nakai et al.
Chem. Pharm. Bull. 26(11)3419-3425(1978)—Effects of Grinding on Physical and Chemical Properties of Crystalline Medicinals with Microcrystalline Cellulose. III. Infrared Spectra of Medicinals, Yoshinobu Naki et al.
Acta Chimica Academiae Scietiarum Hungaricae, Tomus 101 (1-2), pp. 27-46, (1979)—Molecular Encapsulation of Volatile, Easily Oxidizable Labile Flavour Substances by Cyclodextrins, J. Szejtli et al.

*Primary Examiner*—Theodore Morris
*Assistant Examiner*—David M. Brunsman
*Attorney, Agent, or Firm*—Lucas & Just

[57] ABSTRACT

The method employs a ball mill with a charge of cyclodextrin and a guest molecule. The ball mill is operated in a conventional manner for a period between one-half hour to 24 hours. Water can be added to the charge to the ball mill.

6 Claims, No Drawings

CYCLODEXTRIN COMPLEXING METHOD

This invention relates to a method for forming a cyclodextrin complex and, more specifically, the use of a ball mill to form a complex with a cyclodextrin and a guest molecule.

Ball mills are conventional pieces of equipment which are typically used to pulverize or reduce in size the charge to the mill. Generally, ball mills have a cylindrical or conical shell which rotates on a horizontal axis and have a grinding medium of balls contained in the shell. The balls are generally made from steel, flint or porcelain. Typically the length of the shell is about equal in size to the diameter of the shell. The size of the balls varies. The mill is operated by rotating the shell about its horizontal axis so that the pulverizing or size reduction is effected by the tumbling of the balls on the material between them. Ball mills can be operated both batch-wise and continuously.

Cyclodextrins, also called "Schardingers dextrins", cycloamyloses, cyclomaltoses and cycloglucans, are oligomers of anhydroglucose, bonded together by alpha 1, 4 bonds to form a ringed compound. A six membered ring is called alpha cyclodextrin; seven, beta cyclodextrin; and eight, gamma cyclodextrin. These six, seven and eight membered rings are also referred to as cyclomaltohexaose, cyclomaltoheptaose and cyclomaltoctaose, respectively.

Conventionally, cyclodextrins are obtained by treating a starch slurry with enzyme or acid to produce a gelatinized and liquefied slurry having a DE between 1 and 5. The gelatinized and liquefied starch slurry is then treated with cyclodextrin glycosyltransferase (CGT), at the appropriate pH, temperature and time for the selected CGT. The enzyme, CGT, is obtained from microorganisms such as *Bacillus macerans, B. magaterium, B. circulans, B. stearothermohiilus,* and *Bacillus* sp. (alkalophilic) as well as others. The resulting digest from treatment of a gelatinized and liquefied starch slurry with CGT is then subjected to a separation and purification process to obtain cyclodextrins.

One of the commercially important aspects of cyclodextrins is their ability to form complexes with other chemical compounds. Physically a cyclodextrin is donut-shaped. The interior of the donut is hydrophobic. The consequence of this is that cyclodextrins are able to form inclusion complexes with substances that are less polar than water and have outer geometric dimensions corresponding to the diameter of the cyclodextrin cavity. Often the exterior is modified to increase its hydrophilic nature. The cyclodextrin or modified cyclodextrin can be complexed with an insoluble or hydrophobic compound thereby forming a hydrophilic complex. In simple terms this allows a compound insoluble in matter to become soluble in water. The term "cyclodextrin" as used in the specification and claims means not only cyclodextrin per se but also modified cyclodextrins and branched cyclodextrins.

The most widely used method for formation of a complex between a cyclodextrin and a guest molecule involves dissolving the cyclodextrin in water with a guest molecule and collecting the precipitate that forms. One of the problems with such a process is the large volume of water used to form a solution of guest molecule and cyclodextrin. This large volume of water creates processing problems and requires a filtration step to recovering the complex.

Applicants have now discovered that by charging a ball mill with a cyclodextrin and a guest molecule and milling the charge in the ball mill for a period of time, a complex will form between the cyclodextrin and the guest molecule. Such a process needs little water.

Preferably the cyclodextrin-guest charge is milled for a period greater than or equal to about one-half hour and more preferably for a period between about one-half hour and about 24 hours. It is also preferred that the moisture level of the cyclodextrin be in excess of 10% by weight and more preferably in excess of 35% by weight.

The milling is preferably carried out at ambient temperature and pressure.

The cyclodextrin-guest charge in the ball mill is preferably in a molar ratio of cyclodextrin: guest between about 0.5:1 to about 5:1 and more preferably between about 0.75:1 to about 2:1. Good results have been obtained with a charge having a molar ratio of about 1:1, i.e. about one mole of cyclodextrin to every mole of guest molecule.

The ball mill is operated in a conventional manner. Preferably the ball mill is operated at about 50 to about 80% of critical speed. Critical speed is defined as that speed when the centrifugal force on the balls in the shell at the height of its path equals the force due to gravity. This will vary depending on the diameter of the shell.

Preferably the ball-to-void percentage is between about 20% to about 60%. The ball-to-void percentage is the percentage of internal volume of the shell filled by the balls. The preferred charge-to-void percentage is between about 10% to about 70%. The charge-to-void percentage is the percentage of internal volume of the shell filled by the cyclodextrin and guest molecule prior to ball milling.

Preferably porcelain balls or coated stainless steel balls are used. Preferably the balls have a diameter between about ½ inch to about 1 inch. Preferably the ball mill drum shell is lined to prevent contamination. Good results have been obtained with a drum shell made from porcelain.

The density or weight of the balls should be such that they do not stick to the product formed along the walls of the drum.

Preferably the method of the present invention is carried out using a single species of cyclodextrin with a single guest molecule.

Preferably the moisture level of the cyclodextrin is between about 10% to about 70% by dry weight of cyclodextrin and more preferably between about 25% to about 60% moisture by weight. Good results are obtained when operating at moisture levels between about 35% to about 50% by weight. The moisture level is adjusted in a conventional manner and measured in a conventional manner. The ball milled cyclodextrin having a moisture content between about 10 to 20% does not form a paste with the guest molecule.

Preferably the steps in the method of the present invention are: adjusting a cyclodextrin to a moisture level of about 70% and below; and subjecting the cyclodextrin and guest molecule to a ball milling operation for a period of time between about one-half hour and about 24 hours to form a complex between the cyclodextrin and guest molecule; and recovering the complex.

The cyclodextrin and guest molecule is preferably premixed prior to its addition to the ball mill. Such a mixing step is carried out in a conventional manner.

Preferably during ball milling a scraper is used to remove material that sticks to the side of the shell.

These and other aspects of the present invention will be more readily understood by reference to the following examples.

COMPARATIVE EXAMPLE

To illustrate that beta cyclodextrin will not form a complex with cyclohexane when the two are mixed together the following two tests were run:

COMPARATIVE EXAMPLE A

Beta cyclodextrin and cyclohexane were mixed by hand with a spatula in a vial. The vial was then sealed and the mixture was allowed to stand overnight. A portion of the mixture was then air dried. Analysis of this air dried sample using gas chromatography indicated that no complex had formed.

COMPARATIVE EXAMPLE B

Beta cyclodextrin and cyclohexane were again mixed in a vial and the vial sealed as in Comparative Example A. The mixture in the sealed vial was then placed in a 50° C. oven overnight. A portion of the mixture was then air dried. Analysis of the air dried sample using gas chromatography indicated that no complex was formed.

EXAMPLE 1

This example illustrates ball milling a charge of cyclodextrin and cyclohexane in accordance with the present invention.

By hand a mixture of 10.0 g of beta cyclodextrin and 4.0 ml of cyclohexane was formed and placed in a ball mill. The mixture was milled for 30 minutes in the ball mill. After the milling, a portion of the mixture was a loose powder in the container, and a portion was a hard cake adhering to the side of the container. The two portions were removed separately and air dried. Analysis of these air dried samples using gas chromatography indicated that 78% of the beta cyclodextrin in the loose powder and 43% of the beta cyclodextrin in the hard cake were complexed with cyclohexane.

The ball mill used in this example was Spex Mill Model No. 8000 manufactured by Spex Industries, Inc. The shell was made from stainless steel and had an internal void of about 70 ml. The shell measured about 2½ inches in horizontal axis and had a diameter of about 1¼ inches. The ball-to-void percentage was about 7%. Three balls were used in the mill. Each ball was of a different size, one ¾ inch in diameter, a second, ½ inch in diameter and the third, ¼ inch in diameter. Each ball was stainless steel.

The gas chromatography was carried out in a conventional manner.

EXAMPLE 2

This example illustrates varying the time for the milling operation with a charge of cyclohexane and beta cyclodextrin. The ball mill was operated in a manner as disclosed in Example 1 above.

Two mixtures of beta cyclodextrin and cyclohexane were prepared. One mixture contained 10.0 g of beta cyclodextrin and 4.0 ml of cyclohexane, and the other contained 10.0 g of beta cyclodextrin and 1.5 ml of cyclohexane. Both mixtures were placed in the Spex mill and milled for 30 minutes. For both mixtures, loose powder samples were taken after 5, 10, 15, 20, 25, and 30 minutes of milling. These samples were air dried and analyzed using gas chromatography. Tables I and II show the results of the analysis:

TABLE I

| 4.0 ml Cyclohexane Sample | |
|---|---|
| Milling Time (min.) | Percent Complexed |
| 5 | 13.8 |
| 10 | 34.0 |
| 15 | 49.9 |
| 20 | 65.2 |
| 25 | 70.8 |
| 30 | 73.2 |

TABLE II

| 1.5 ml Cyclohexane Sample | |
|---|---|
| Milling Time (min.) | Percent Complexed |
| 5 | 32.7 |
| 10 | 41.7 |
| 15 | 47.7 |
| 20 | 52.0 |
| 25 | 57.6 |
| 30 | 54.4 |

EXAMPLE 3

This example illustrates extended periods of milling with a charge of beta cyclodextrin and cyclohexane.

A mixture of 100 g of beta cyclodextrin containing approximately 12% moisture and 15.0 ml of cyclohexane was placed in a ball milling apparatus. The mixture was milled for 24 hours. Samples of the mixture were taken after 3, 5, and 6 hours from the surface of the hard cake of material that formed on the side of the container. At 6 hours a sample was also taken from the loose powder in the container. After 24 hours all of the mixture was removed from the container and a composite sample was taken from this material. The samples taken were air dried and analyzed using gas chromatography. Table III illustrates the results of the analysis:

TABLE III

| Sample | Percent Complexed |
|---|---|
| From cake surface after 3 hours | 24.4 |
| From cake surface after 5 hours | 43.1 |
| From cake surface after 6 hours | 48.6 |
| Loose material after 6 hours | 85.5 |
| Composite after 24 hours | 14.5 |

The molar ratio of 15 ml of cyclohexane to 100 g of cyclodextrin is 1.6:1. It should be noted that complexation is superior in the loose powder compared to the cake, the cake being that portion of the cyclodextrin and guest molecule that forms on the side of the shell. It is hypothesized that the layer of cake closest to the interior, i.e. farthest away from the shell, has the highest degree of complexation.

In the example the ball mill was a Model No. 753 RM manufactured by Norton Chemical Process. The mill had a No. 00 porcelain shell which was rotated at 97 RPM. The shell had a volume of 1100 ml. The balls were Burundum cylindrical grinding media. The balls measured 13/16 inch long and had a specific gravity of 3.42. There were 50 balls in the mill which had a total volume of 360 ml (33% ball-to-void percentage).

EXAMPLE 4

This example illustrates ball milling a cyclodextrin-guest charge at a low moisture level.

100 g of beta cyclodextrin was dried in a vacuum oven for 24 hours at 120° C. to a moisture level of approximately 0.14%. This beta cyclodextrin was mixed with 15.0 ml of cyclohexane. This mixture was ball milled for 24 hours. The mill was operated in accordance with Example 3 above. After milling, the mixture was removed from the container and allowed to air dry. The air dried mixture was then analyzed using gas chromatography. Analysis indicated that approximately 27.6% of the beta cyclodextrin was complexed with cyclohexane.

It was noted that the 12% moisture level in Example 3 resulted in a more compact cake on the surface of the mill than the cake formed in this example.

EXAMPLE 5

This example illustrates extended milling time coupled with multiple additions of guest molecules. The charge was operated according to Example 4 above.

A 100 g sample of oven dried beta cyclodextrin having a moisture level of less than 0.5% was mixed multiple times with a 5 ml sample of cyclohexane and subjected to a ball mill operation. For each addition of cyclohexane the mill time is shown in Table IV below as well as the total elapsed mill time. At each step, the total contents of the mill was removed, air dried and thoroughly mixed with the newly added cyclohexane. At various points between the milling steps, composite samples of the mixture were removed and tested for degree of complexations (a composite sample being both loose powder and cake). The analysis results by conventional gas chromatography for the composite by conventional gas chromatography for the composite sample is reported in Table IV below.

TABLE IV

| Mill Step | Cyclohexane Added(ml) | Mill Time(hr) | Total Elapsed Mill Time(hr) | Percent Complexed |
|---|---|---|---|---|
| 1 (initial) | 5.0 | 5 | 5 | — |
| 2 | 5.0 | 6 | 11 | — |
| 3 | 5.0 | 18 | 29 | 27.5 |
| 4 | 5.0 | 24 | 53 | — |
| 5 | 5.0 | 24 | 77 | 69 |
| 6 | 5.0 | 24 | 101 | — |
| 7 | 5.0 | 24 | 125 | 78.8 |
| 8 | 5.0 | 24 | 149 | — |
| 9 | 5.0 | 24 | 173 | 100 |

It can be seen from this Example that the amount of complexing increases with time.

EXAMPLE 6

This example illustrates extended mill time coupled with two large additions of guest molecule. The charge to the mill was cyclodextrin and menthol. The ball mill was operated in accordance with Example 3 above.

A 100 g sample of oven dried, 0.5% moisture, beta cyclodextrin was mixed with 15 g of menthol and was ball milled for repeated steps. At each step the contents of the mill was removed and mixed. After such mixing, samples of the composite mix, loose powder and cake, were analyzed by conventional gas chromatography to determine the amount of complexation. To remove uncomplexed menthol from the sample, the sample was first dried at 200° F. prior to gas chromatography. These results are reported in Table V below.

TABLE V

| Mill Step | Menthol Added(ml) | Mill Time(hr) | Total Elapsed Mill Time(hr) | Percent Complexed |
|---|---|---|---|---|
| 1 (initial) | 15 | 24 | 24 | 4.6 |
| 2 | — | 24 | 48 | 16.2 |
| 3* | — | 24 | 72 | 44.6 |
| 4 | — | 24 | 96 | 49.0 |
| 5 | 15 | 24 | 120 | 49.0 |
| 6 | — | 24 | 144 | 71.4 |

*10 ml water added to raise moisture level to 10%.

The molar ratio of 15 g of menthol to 100 g cyclodextrin is 1.1:1.

EXAMPLE 7

This example illustrates varying the percent moisture with a charge of menthol and cyclodextrin. The ball mill was operated in accordance with Example 3 above.

EXAMPLE 7A

A series of mixtures containing 15 g of menthol and 100 g of beta cyclodextrin, dry basis, were prepared. Water was added to the cyclodextrin to adjust the percent water in the beta cyclodextrin to different levels prior to the addition of menthol. The mixtures were then ball milled for 24 hours. Portions of the mixtures were then dried at 200° F. and the dried mixtures were then analyzed using gas chromatography. Table IV below shows the results of these analyses:

TABLE VI

| Percent Water in the Beta Cyclodextrin | Percent Complexed |
|---|---|
| 25 | 57.5 |
| 35 | 76.9 |
| 50 | 75.8 |
| 65 | 61.3 |

From this example it was concluded that the optimum moisture range was about 35% to about 50%.

PART 7B

The mixture from Part 7A with 35% water was ball milled an additional 24 hours. The mixture was then dried at 200° F. and analyzed using gas chromatography. Analysis indicated that approximately 81% of the beta cyclodextrin was complexed with menthol. From this example it can be seen that the additional mill time, while producing better results, does not substantially increase the amount of complexation.

EXAMPLE 8

This example illustrates using the ball mill of Example 3 with 100 high density Zirconia balls, ½ inch long with a specific gravity of 5.5. The 100 balls had a volume of 140 ml and a 13% ball-to-void ratio.

Beta cyclodextrin having a moisture content of 35% was mixed with 15 g of menthol and then ball milled for 24 hours. This resulted in 74.5% complexation. Mixing and ball milling for an additional 24 hours resulted in 81% complexation.

It will be understood that it is intended to cover all changes and modifications of the preferred embodiment of the invention herein chosen for the purpose of illustration which do not constitute departure from the spirit and scope of the invention.

What is claimed is:

1. A method for forming a complex between a cyclodextrin and a guest molecule comprising the steps of:
   (a) forming a mix of a cyclodextrin having a moisture content between about 25% to about 65% by weight with a guest molecule;
   (b) charging a shell of a ball mill with said mix of cyclodextrin and guest molecule and with a plurality of balls;
   (c) horizontally rotating said shell with said plurality of balls and said mix therein for a period of about one half hour to about 24 hours at about 50% to about 80% of critical speed to form a complex between said cyclodextrin and said guest molecule; and
   (d) scraping the sides of the ball mill during rotation of said shell to remove material that sticks to the sides of the shell.

2. The method of claim 1 wherein the cyclodextrin is beta cyclodextrin.

3. The method of claim 1 wherein the moisture level of the cyclodextrin is adjusted to between about 35% to about 70% by weight.

4. The method of claim 1 wherein the molar ratio of cyclodextrin:guest molecule is between about 0.5:1 to about 5:1.

5. The method of claim 1 wherein there is a ball-to-void ratio of between about 10% to about 70%.

6. A method for forming a complex between a cyclodextrin and a guest molecule comprising the steps of:
   (a) forming a mix of beta cyclodextrin having a moisture content between about 10% to about 70% by weight with a guest molecule selected from the group consisting of cyclohexane and menthol;
   (b) charging a shell of a ball mill with said mix of cyclodextrin and a guest molecule and with a plurality of balls;
   (c) horizontally rotating said shell with said plurality of balls and said mix therein for a period of about one half hour to about 24 hours at about 50% to about 80% of critical speed to form a complex between said cyclodextrin and said guest molecule; and
   (d) scraping the sides of the ball mill during rotation of said shell to remove material that sticks to the sides of the shell.

* * * * *